Feb. 1, 1972   A. F. FITZHUGH ET AL   3,639,330
METAL COATING COMPOSITIONS AND METAL COATED THEREWITH
Filed Oct. 3, 1969
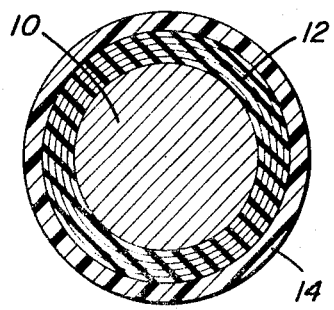
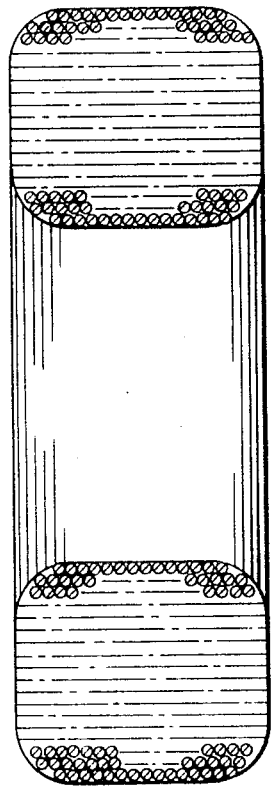
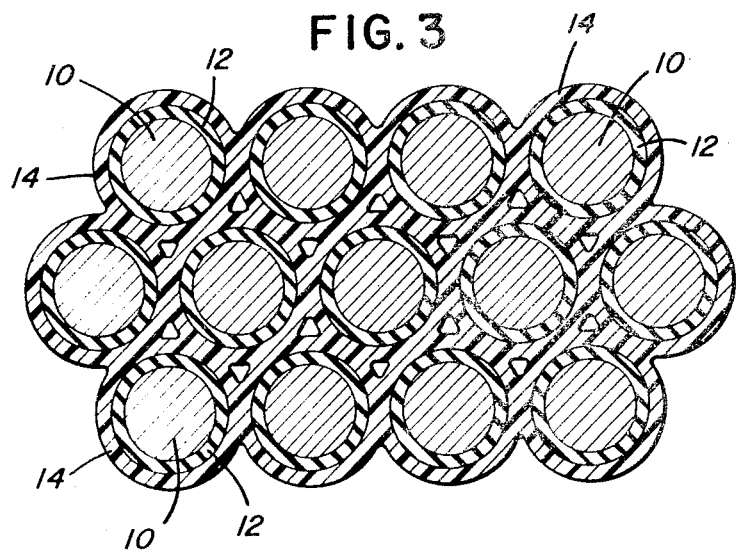
INVENTORS
ANDREW F. FITZHUGH,
RODNEY M. HUCK
BY *John W. Klooster*
ATTORNEY United States Patent Office 3,639,330
Patented Feb. 1, 1972

3,639,330
METAL COATING COMPOSITIONS AND METAL COATED THEREWITH
Andrew F. Fitzhugh and Rodney M. Huck, Longmeadow, Mass., assignors to Monsanto Company, St. Louis, Mo.
Filed Oct. 3, 1969, Ser. No. 864,304
Int. Cl. C08c 1/36; C08f 45/42; C08g 51/42
U.S. Cl. 260—31.4    9 Claims

ABSTRACT OF THE DISCLOSURE

Enamels suitable for use in coating metal or enamelled surfaces to impart not only electrical insulation thereto, but also the capacity to thermally bond to other surfaces. Coatings so bonded display unusually high rupture strength at elevated temperatures. The enamels use a mixture of (1) a condensate of amine-modified novolac resin and (2) a polyvinyl acetal.

---

In the field of metal coatings, particularly coatings for magnet wire, electrically non-conductive coatings which would be thermally or solvent bondable to a polar surface to produce bonded structures of improved strength are known to those skilled in the art. Such protective bondable coatings conventionally find use in a variety of applications, as those skilled in the art appreciate, including television yoke coils, and the like.

A particularly common fault associated with bondable enamel compositions in the prior art is that the bonded coating-to-coating product or the composite bond between two metal surfaces bonded together through the coating between them, lacks strength at elevated temperatures, say, temperatures, above about 100° C. A high bond strength between, for example, adjacent coated wires is desirable in order to provide a rigid, durable, stress-resistant article of manufacture containing a plurality of wires bonded together, such as an armature, or the like. Failure of such a bond can mean a loss of structural integrity and at times also a loss of electrical insulation to the metal surfaces needing such protection.

There has now been discovered a new enamel composition well adapted for use in coating metal or enamelled surfaces, especially wires, which provides electrical insulation, and which has the capacity to bond to polar surfaces especially wires likewise coated either by the application of heat alone or by the application and subsequent removal of solvents which may contain chemical co-reactants. Coatings so bonded together display superior strength characteristics at elevated temperatures, even at temperatures of 100° C. to 200° C., depending upon the particular enamel composition involved.

These new enamel compositions employ a combination of two different polymers, one resin being an amine-modified novolac resin; the other a polyvinyl acetal. Neither of these respective resins by itself is capable of producing coatings combining flexibility, electrical insulation, bondability, and high bond strength at elevated temperatures after self-bonding but these two different polymers together display all these properties. Thus, when employed as a coating, the amine-modified novolac resins are generally too brittle for use as coatings for many applications, such as magnet wire, while the polyvinyl acetals characteristically have glass transition temperatures below 110° C. so that their strength at more elevated temperatures is poor, indeed. The reason these two different types of resins coact to produce coatings having the superior qualities above indicated is not clearly understood, but some sort of synergistic coaction between them appears to be involved.

The resin combination of this invention makes possible the preparation of many new types of articles of manufacture not heretofore known owing to the high bond strength associated with bonded coatings using such combination, and the maintenance of such high bond strength at elevated temperatures. Thus, for example, using such a combination one can make motor components, such as field coils and armatures, incorporating wire topcoated with an enamel containing such resin combination. These components can then be subjected to elevated temperatures, for example, by externally applied or internal electrical resistance heating of such components, sufficient to bond coatings on adjacent wire members together and thereby produce in a single step a desired rigid, monolithic, elevated temperature stable article of manufacture. Heretofore, such a product was produced by first manufacturing the motor element and then thereafter post-treating such element with one or more treatments, such as varnish impregnation (using, for example, dip coating or trickle impregnation), or resin encapsulation (using, for example, epoxy resins and elevated temperatures). Such prior art procedures are typically costly and time consuming. By using the combinations of the present invention, prior art disadvantages are overcome and it becomes practical, for example, to make products having superior strength at elevated temperatures without such post-treatments.

SUMMARY

This invention is directed to resin compositions of certain amine-modified novolac resins with certain polyvinyl acetals. These compositions are useful as substrates, especially as over coatings on wire, such as magnet wire or the like, and are readily prepared as liquid enamels to facilitate application to such wire. These compositions when in the form of coatings on substrates among other useful properties have the capacity to thermally bond to polar surfaces in contact therewith. When such bonding is achieved between adjacent, previously discrete coatings derived from compositions of this invention, the product bonded structures display surprising and unexpected bond strengths at elevated temperatures (e.g. temperatures between about 100° and 200° C.).

Briefly, the resin compositions of this invention comprise in combination:

(A) A polyvinyl acetal characterized by having:
 (1) A weight average molecular weight of from about 5,000 to 250,000, and
 (2) From about 0.5 to 16 weight percent ester groups calculated as polyvinyl ester, from about 5 to 25 weight percent hydroxyl groups calculated as polyvinyl alcohol, and the balance up to 100 weight percent of any given polyvinyl acetal being substantially aldehyde acetal calculated as the corresponding polyvinyl acetal.

(B) An amine-modified novolac resin characterized by having:
 (1) A number average molecular weight of from about 200 to 1,000,
 (2) At least two aryl moieties per molecule, the aryl nucleus of each aryl moiety containing from 6 through 10 carbon atoms each,
 (3) At least one divalent bridging moiety of the formula:

wherein $R_1$ and $R_2$ are each individually selected from the group consisting of hydrogen lower alkyl, lower alkalene, lower haloalkyl aryl of from 6 through 12 carbon atoms, haloaryl of 6 through 12 carbon atoms, and heterocyclic structures containing rings with 5 or 6 members each, each individual ring containing an oxygen, a sulphur, or a nitrogen atom, each such heterocyclic structure being bonded to the carbon atom of said bridging moiety, said bridging moiety having the unsatisfied valences of its carbon atom each bonded to a different one of said aryl moiety, (4) At least one >NH group per molecule, one bond of which is directly attached to one of said aryl nuclei and the other bond of which is attached to another of said aryl nuclei or to a radical $R_1$ as defined above, (5) At least one OH group per molecule each such group being directly attached to a different one of said two aryl nuclei, (6) A percent oxygen acetyl of from about 3 to 26, and (7) A percent nitrogen acetyl of from about 3 to 26.

While the compositions of this invention need employ such amine-modified novolac resin and such polyvinyl acetal in no particular proportions (since the properties of the compositions above discussed and below illustrated are present with even vanishingly small proportions of one such polymer component relative to the other, and vice versa), it is preferred to employ such compositions wherein there is a weight ratio (dry weight basis) of said polyvinyl acetal to said amine-modified novolac resin of from about .15 to 15, and more preferably from about 0.5 to 3.

At the time of use in coating substrate surfaces (preferably conventionally enamelled magnet wire), such a composition is preferably in the form of a liquid composition (which can be considered to an enamel). Such a liquid composition of this invention comprises a composition of the above-described polyvinyl acetal and the above-described amine-modified novolac resin in the respective weight ratios above indicated which composition is dispersed in from about 10 to 98 weight percent (total composition basis) of an organic liquid which:

(1) Is substantially inert (as respects said resin and said polyviny acetal), (2) Has a dry point below about 275° C. at atmospheric pressures (preferably below about 230° C.), and (3) Is a dispersant for both said resin and said polyvinyl acetal.

Preferably, the weight percent (same basis) of such organic liquid ranges from about 50–85. For example, an enamel may be sold as a concentrate containing from about 30–50 weight percent of a composition of the invention which, before actual application to a wire as an overcoat over previously applied insulative material thereon, is diluted to a liquid system containing from about 5 to 35 weight percent of a composition of this invention. Preferably, also, such organic liquid is a true solvent for both said resin and said polyvinyl acetal.

Optionally, in such an enamel, up to about 4 weight percent dissolved (in the said organic liquid) water can be present, provided the actual quantity of water present in any given liquid composition of the invention is such that the composition is substantially a single liquid phase, homogeneous system.

When in a solid state, the compositions of this invention can exist in either of two forms, generally. Particulate solids or continuous solids, the latter including coatings, sheets, films, molded bodies; the former, powders, etc. In addition to their use as protective and/or bondable coatings, the compositions of this invention are useful as adhesives (e.g. when in the form of sheets and films, as adhesive interlayers between a pair of adjacent polar surfaces), as molding powders, and the like, as will be apparent to those skilled in the art from the teachings of the present document.

This invention is also directed to metal objects, or metal substrates, at least one surface of which is overcoated with at least one layer of a coating comprising a composition of this invention. One preferred metal substrate is copper, particularly in the form of electrically conductive wire; another preferred metal substrate is iron, especially in the form of steel sheeting of the type which may be formed into steel drums, and the like. The term "metal" as used herein refers to any electro-positive chemical element or mixture thereof characterized by ductility, malleability, luster, and conductivity of heat and electricity, and which can replace the hydrogen of an acid and form bases with the hydroxyl radical.

When liquid enamel compositions of this invention (as indicated above) are applied to substrate polar surfaces in a coating operation, the liquid is removed following application to such a surface. Although evaporation conditions are certainly not critical, the choice being largely a matter of mere convenience to the user, typical evaporation temperatures for organic liquids commonly employed ranging from about 115 to 275° C. applied for times of from about 5 seconds to 5 minutes are used, through times and temperatures above and below these values (inversely as respects one another, respectively) can be employed, of course, as those skilled in the art will readily appreciate.

This invention is further directed to articles of manufacture produced by bonding together solid coatings on substrates, the coatings comprising compositions of this invention. A particularly presently preferred class of such articles of manufacture are coils of wire, howsoever formed, including yoke coils and those prepared on iron cores, such as field coils, armatures, and the like, as those skilled in the art of electromechanical systems will readily appreciate. Typical thermal bonding conditions for bonding a coating of this invention to a polar surface (especially a polar surface comprising a coating of this invention) utilize temperatures of about 150 to 250° C. applied for times of from about 2 to 120 minutes.

THE AMINE-MODIFIED NOVOLAC STARTING MATERIAL

In general, any amine modified novolac resin known to the prior art having the above-described characteristics can be used in the compositions of this invention. Because of possible ambiguities in prior art teachings relating to production of amine-modified novolacs, a brief discussion of the preparation and properties thereof are now given.

For purposes of this invention, "oxygen acetyl percent" of an amine-modified novolac is conveniently determined by the method of Stroh and Liehr, J. Prakt. Chem. 29 (1–2), H. (1965).

Similarly, for purposes of this invention, "total acetyl percent" of an amine modified novolac is conveniently determined by the method of Siggia. Nitrogen acetyl percent is obtained by difference.

Typical beginning materials suitable for use in making amine modified novolac resins are:

(A) A phenol which has at least one unsubstituted reactive position on the aromatic nucleus, (B) An aromatic amine which has at least one primary amine group or at least one secondary amine group substituted on an aromatic nucleus, and (C) An aldehyde containing at least one aldehyde group.

The phenols which can be employed in this invention are aromatic alcohols which have at least one hydroxyl group directly attached to the aromatic nucleus and which have at least one unsubstituted reactive position on the aromatic nucleus. It is normally the case that the reactive positions on the aromatic nucleus are those which are ortho and para to the hydroxyl group. Therefore, phenols which have at least one unsubstituted position ortho or para to the hydroxyl group are particularly useful. Examples of representative and illustrative phenols which can be employed in this invention are given in Table I below:

TABLE I.—EXAMPLES OF PHENOLS

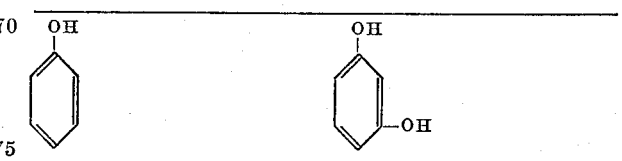

TABLE I—Continued

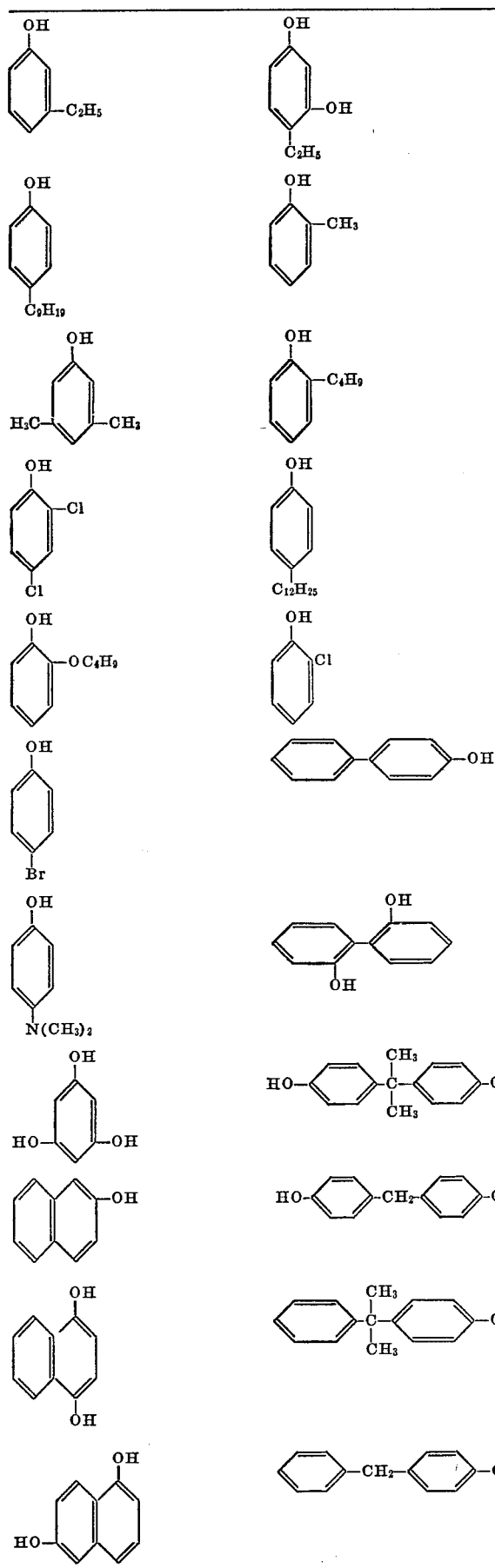

TABLE I—Continued

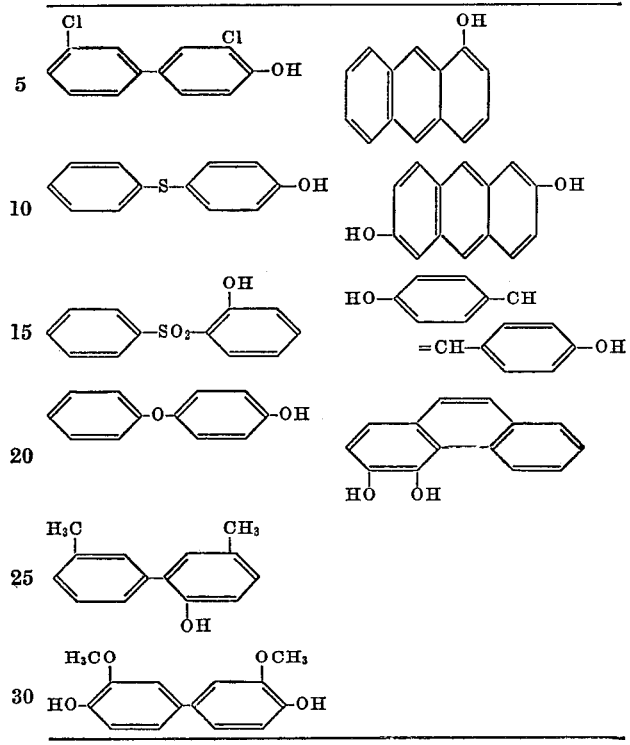

Preferred phenols are phenol itself, alkylphenols, and aryl phenols wherein substituents on this phenol benzene ring have a total of from 1 to 18 carbon atoms, and most preferably, from 1 to 6 carbon atoms.

The aromatic starting amines which can be employed can be of many different types. Thus, it can be a class represented by the formula:

(3)                  $ArNH_2$ wherein Ar is an aryl group which has at least one unsubstituted reactive position on the aromatic nucleus. It can also be a class represented by the formula:

(4)                  $\underset{R_5}{ArNR}$ wherein Ar is as just defined and $R_5$ is an alkyl radical, an aryl radical, an aralkyl radical, an alkaryl radical, or the like. Preferably, in Formulas 3 and 4, Ar is a phenyl radical and $R_5$ contains less than 11 carbon atoms.

Ordinarily in both Formula 3 and Formula 4 amines, the reactive positions are those which are ortho and para to the amino group. Accordingly, aromatic amines which have at least one unsubstituted position ortho or para to the amino group are preferred for use in preparing the condensation products employed in the invention. The presently most preferred aromatic amines are aniline, the alkyl-substituted anilines wherein the alkyl groups thereof have from 1 to 4 carbon atoms, and the alkyl-substituted diaminobenzenes wherein the alkyl groups thereof have from 1 to 4 carbon atoms. Examples of representative and illustrative aromatic amines of Formulas 3 and 4 above are given in Tables II and III, respectively, below:

TABLE II.—EXAMPLES OF FORMULA (3) AMINES

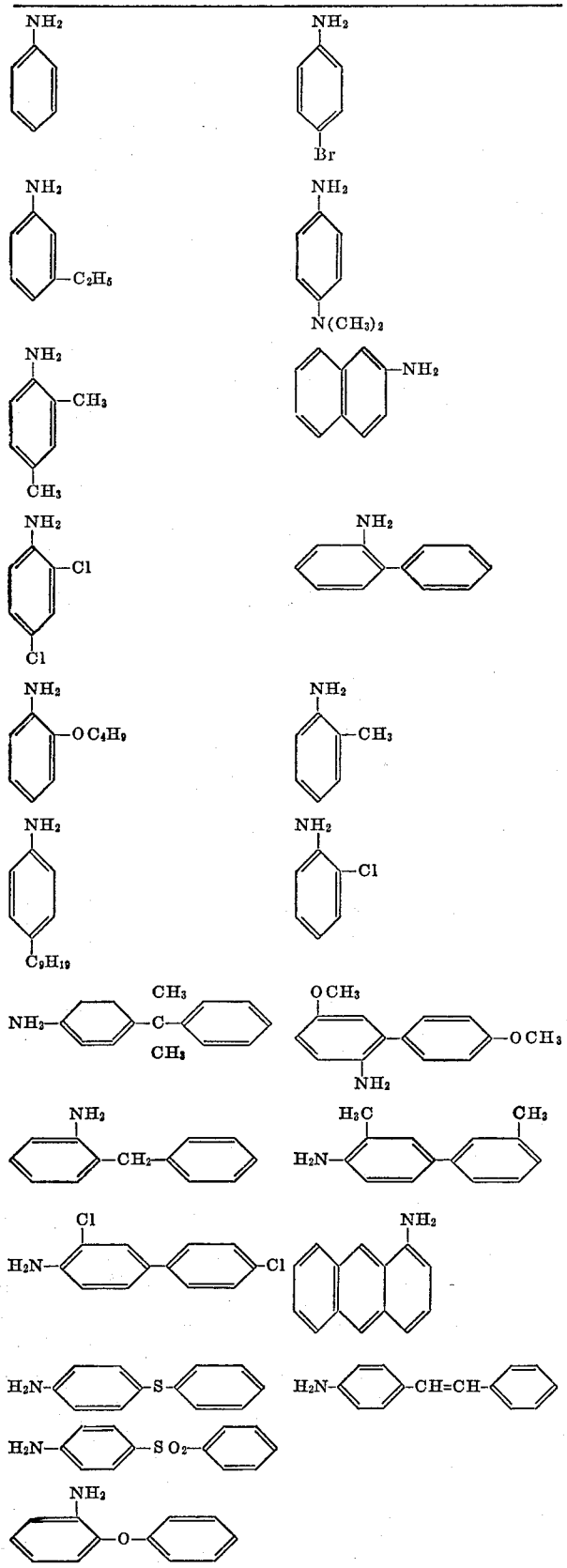

TABLE III.—EXAMPLES OF FORMULA (4) AMINES

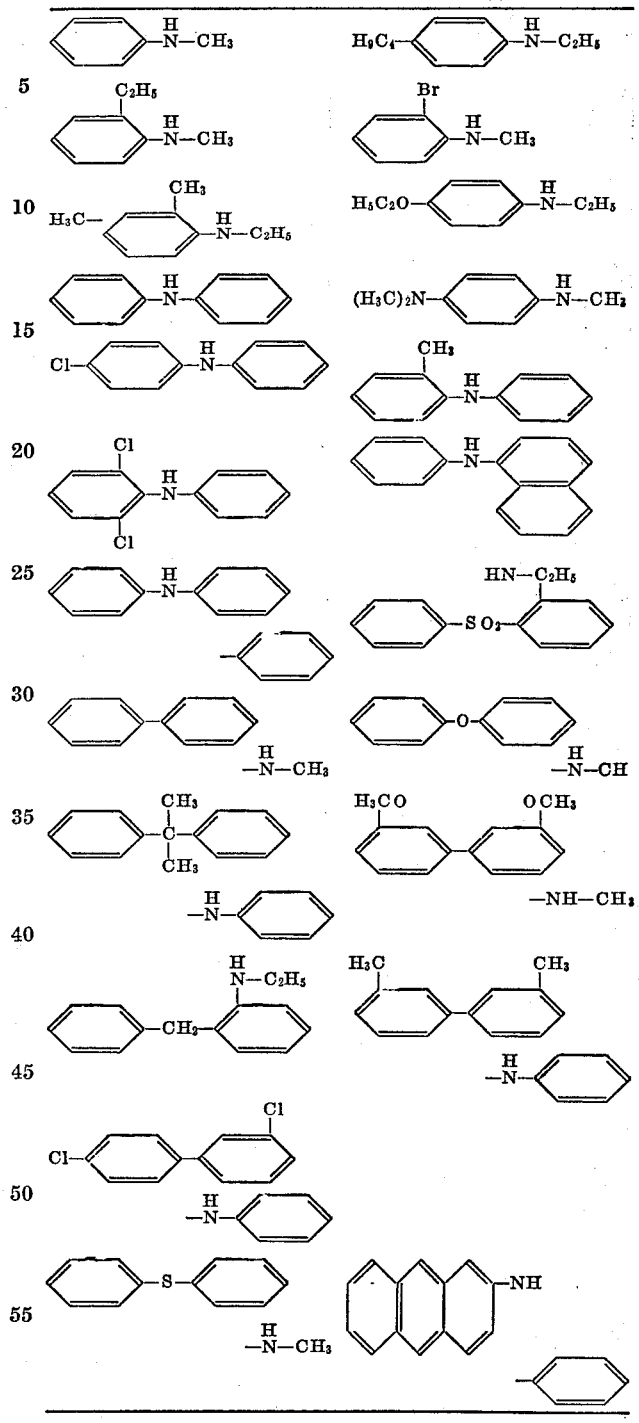

The amines operative in the present invention can be aromatic diamines. Both aromatic primary and secondary diamines are operative in the present invention, but the aromatic primary diamines are preferred over the secondary because the secondary diamines are less desirable as the thermal stability and hydrolytic stability are apparently less than the primary diamines. The diamines are of the general formula:

(5) $\quad H_2N-R_6-NH_2$ wherein $R_6$ is a divalent aromatic radical. Also operative are aromatic diamines having the general formula:

(6) $\quad H_2N-R_6-NHR_7$ wherein $R_6$ is as above and $R_7$ is an alkyl radical, an aryl radical, an aralkyl radical, an alkaryl radical, or the like. Preferably, $R_6$ is a phenyl radical and $R_7$ is a lower alkyl radical. Examples of representative and illustrative aromatic amines of Formulas 5 and 6 above are given in Tables IV and V, respectively, below:
TABLE IV.—EXAMPLES OF FORMULA 5 AMINES
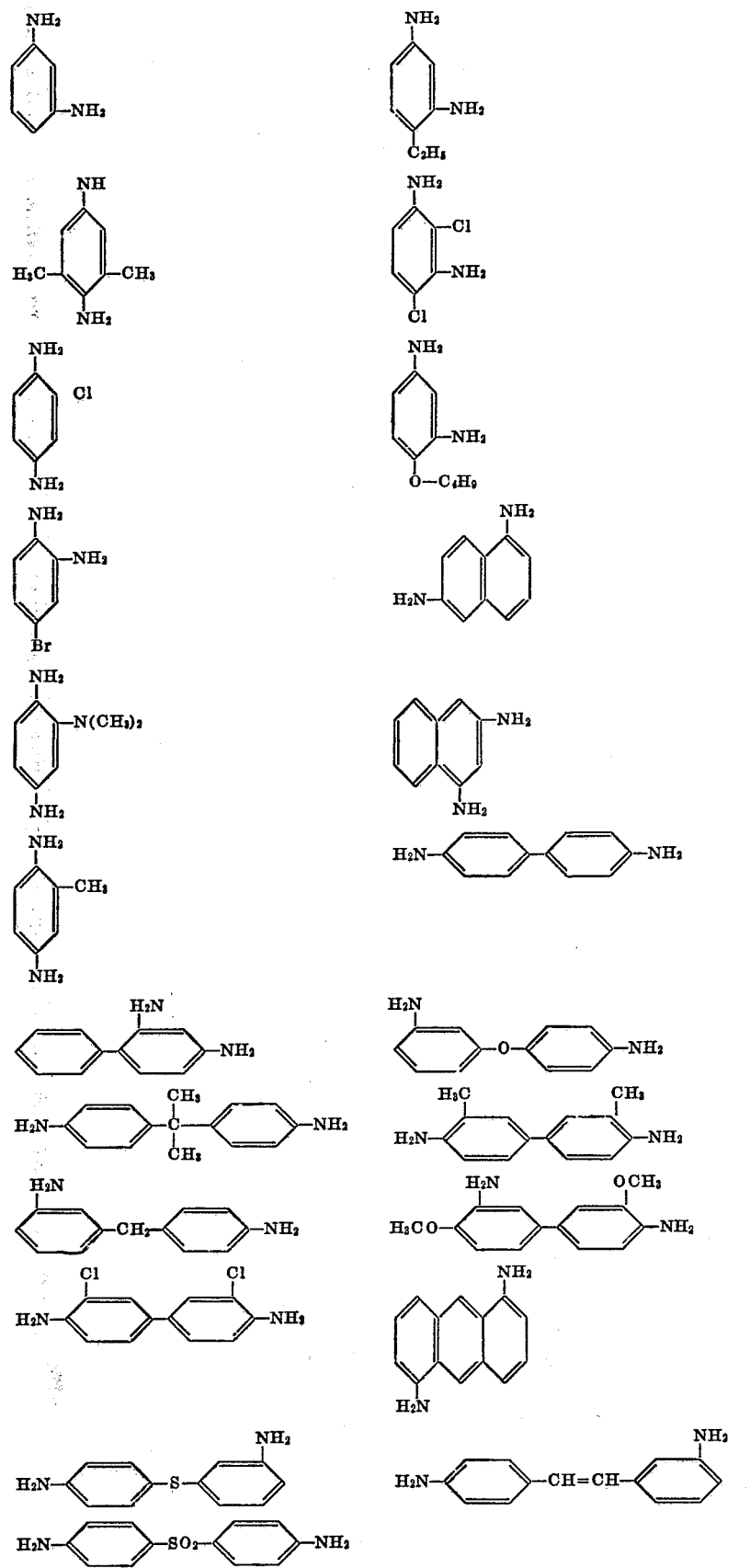

TABLE V.—EXAMPLES OF FORMULA (b) AMINES
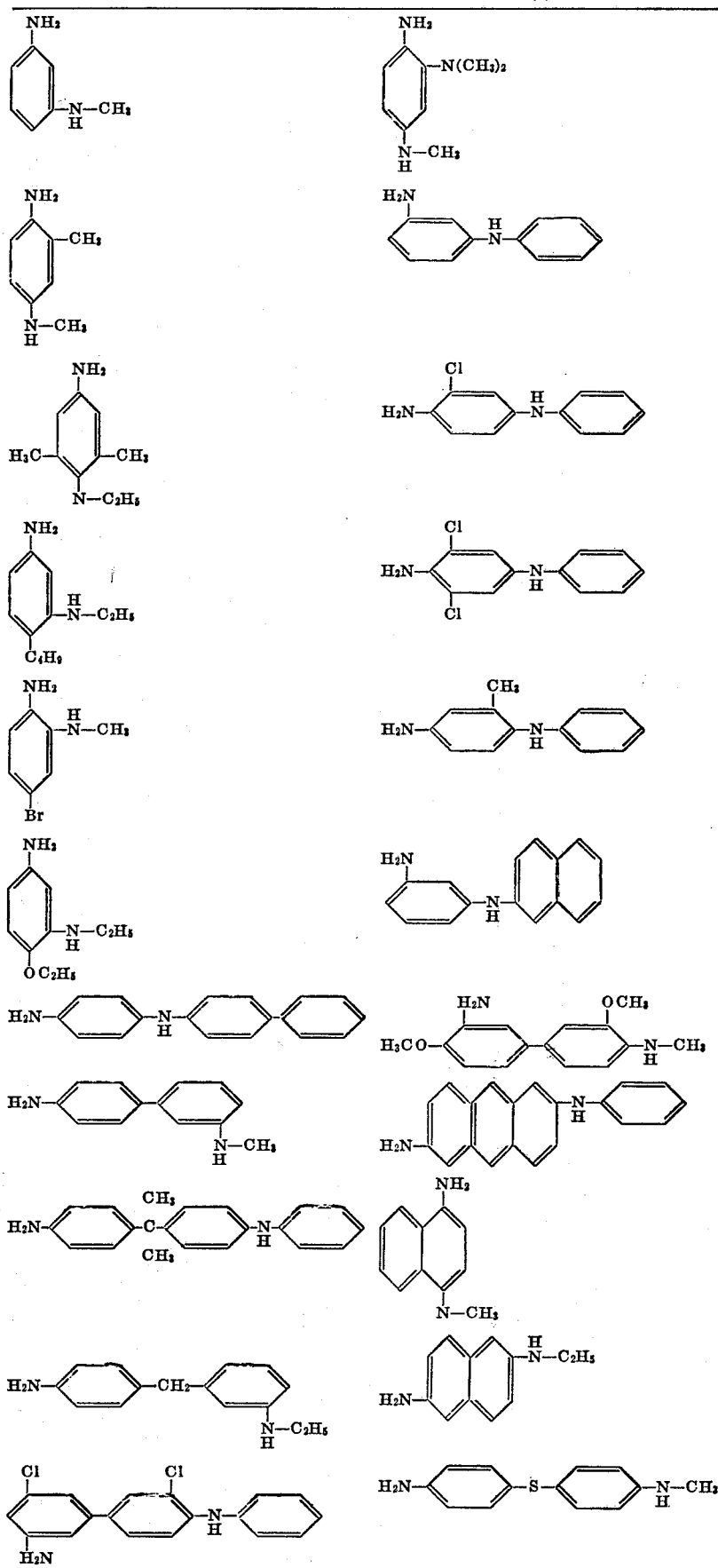

TABLE V.—Continued

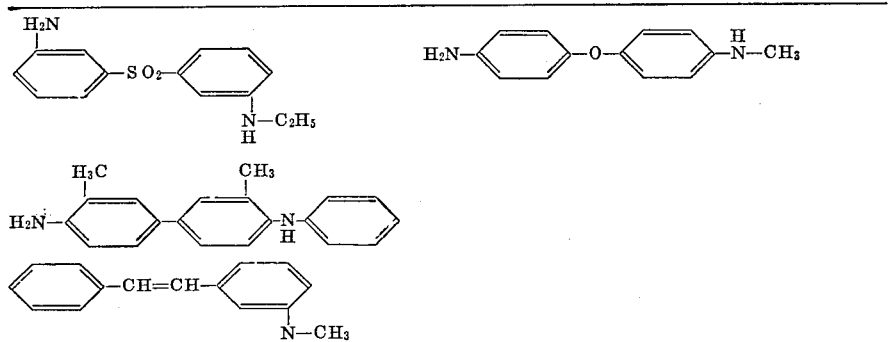

The aldehydes which can be employed are alkanals such as formaldehyde, acetaldehyde, propionaldehyde and the like, arylals such as benzaldehyde, salicylaldehyde, and the like, haloalkanols, such as chloral, and the like. Formaldehyde is preferred. The formaldehyde can be employed in water solution or dispersion, or in an organic solvent such as methanol. It is preferred to employ the formaldehyde in aqueous solution (such as the 37 weight percent aqueous solution known as Formalin). Paraform can also be used.

Sometimes, if desired, the phenol and the aromatic amine can be combined into a single starting compound wherein the same aromatic nucleus has substituted thereon at least one hydroxyl group and at least one primary or secondary amine group. Similarly, if desired, the phenol and the aldehyde can be combined into a single starting compound wherein the same aromatic nucleus has substituted thereon at least one aldehyde group and at least one hydroxyl group. Similarly, if desired, the aromatic amine and the aldehyde can be combined into a single starting compound wherein the same aromatic nucleus has substituted thereon at least one aldehyde group and at least one primary or secondary amine group. Examples of such representative and illustrative polyfunctional starting materials are given in Tables VI, VII, and VIII below:

TABLE VI.—EXAMPLES OF AMINOPHENOL COMPOUNDS

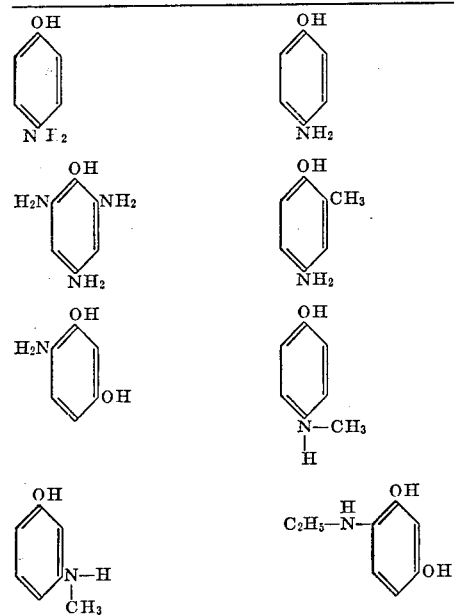

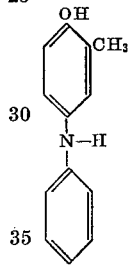

TABLE VII.—EXAMPLES OF AROMATIC PHENOL-ALDEHYDE COMPOUNDS

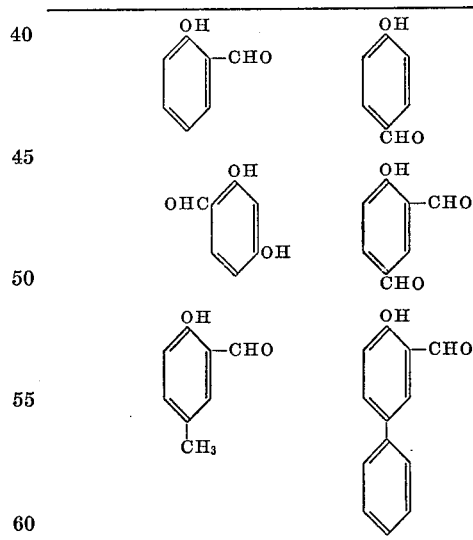

TABLE VIII.—EXAMPLES OF AROMATIC AMINE ALDEHYDES

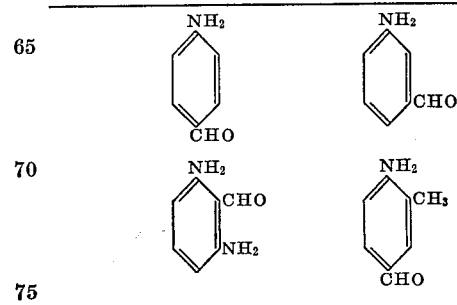

TABLE VIII—Continued

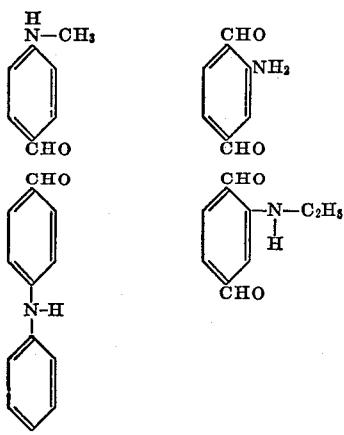

When such a composite polyfunctional starting material is employed, it is preferred to use such in admixture with an aromatic amine, a phenol, and an aldehyde. For example, one could employ up to about 50 weight percent of such a polyfunctional starting material in making an amine modified novolac.

When one makes an amine modified novolac resin using, for example, a phenol, an aromatic amine and an aldehyde, it is convenient and preferred to condense the starting materials under aqueous liquid phase conditions using heat and an acid catalyst. Conventional and preferred acid catalysts are organic carboxylic acids (mono or polybasic) which are relatively strong as respects their disassociation constants. Examples of suitable such acid catalysts include: aliphatic carboxylic acids, such as formic, propionic, oxalic, diglycolic, fumaric, itaconic, lactic, maleic, malonic, and the like, and aromatic mono and dicarboxylic acids, such as naphthoic, phthalic, salicylic, and the like.

The amount of acid catalyst employed can vary but in general is sufficient to produce a pH in an aqueous liquid phase medium of from about 1.5 to 6.0 (preferably from about 2.0–4.0) but this is not necessarily a critical factor.

The proportion of reactants employed is likewise not necessarily a critical factor, and can be varied over a wide range. For example, the mol ratio of aromatic amine groups to phenolic —OH groups ranges from about 90/1 to 1/90 and the mol ratio of aldehyde to the sum of aromatic amine groups plus phenolic —OH groups ranges from about 0.5 to 0.99. For instance, in a preferred specific embodiment, the charged mol ratio of aniline to phenol can range from about 95:5 to 5:95, though a more preferred range is from about 1:1 to 9:1. Similarly, and for example, the charged mol ratio of formaldehyde to the sum total of aniline and phenol is less than about 1:1. In general, the higher the aniline content, the higher the formaldehyde to combined aniline and phenol mol ratio can be without a generally undesirable gelation (because gelation substantially prevents solution) occurring as a side phenomenon during condensation. To avoid gelation in making such a preferred embodiment, the following relationships can be used as guides:

TABLE 1

| At aniline/phenol mol ratio: | Use formaldehyde to aniline plus phenol mol ratio |
| --- | --- |
| 1:1 | Smaller than 0.70:1. |
| 90:10 | Smaller than 0.95:1. |
| 60:40 | Smaller than 0.75:1. |
| 80:20 | Smaller than 0.80.1. |

For such a condensation, the acid catalyst is preferably formic acid, oxalic acid, or propionic acid in an amount of from about 0.5 to 5 parts catalyst per 100 parts phenol (by weight). The temperature of reactants in such preferred embodiment can vary from about 60° to 100° C. Agitation of reactions during condensation is preferably continuous. It is not necessary for the reactants to be charged together to a reactor; thus, formaldehyde can be slowly added to a warmed mixture of aniline, phenol and acid catalyst. The entire condensation may be carried out at reflux temperatures if desired. Since a cocondensation reaction is apparently involved, the reaction mechanism, it is theorized, may involve formation of low molecular weight intermediates which initially form, and then possibly rearrange and combine with one another at a later stage. Typically, condensation reaction conditions are maintained until all aldehyde is consumed.

In general, conventional equipment can be employed for the condensation reaction. For example, a reaction kettle equipped with agitator, means for reflux and distillation, nitrogen inlet means, and conventional heat transfer means is suitable. The material of construction can be steel, stainless steel, glass, Monel, or the like.

In general, a preferred method for carrying out the condensation reaction of the phenol, aldehyde, and amine starting materials is to add the aldehyde slowly to an agitated mixture of phenol and aromatic amine containing the acid catalyst. This mixture is maintained at a temperature of from aobut 50° C. to about 125° C., and peferably from about 70° C. to about 105° C. during the addition. After the addition of aldehyde, which can take from about one hour to about four hours or longer, the condensation reaction is continued for about 30 minutes to about 3 hours at a reaction temperature of from about 50° C. to about 125° C., and preferably, from about 95° C. to about 100° C. At the end of the reaction period, the condensation product can then be recovered by stripping off water and unreacted reagents under reduced pressure at temperatures from about 110° C. to about 200° C., and preferably, from about 140° C. to about 170° C.

Another method for carrying out the condensation reaction is to methylolate a phenol (monomethylolation) by reacting a phenol with an aldehyde under base catalysis at temperatures of from about 50° C. to about 110° C., and preferably from about 60° C. to about 80° C. The reaction mixture is then made (slightly) acidic (if not already so) and the aniline is added and condensed with the foregoing at temperatures of from about 50° C. to about 125° C., and preferably, from about 95° C. to about 100° C. At the end of the reaction period, the condensation product can be recovered by stripping off water and unreacted reagents under reduced pressure at temperatures from about 110° C. to about 200° C. and preferably, from about 140° C. to about 170° C. Yet another method for carrying out the condensation reaction is to make a phenolic novolac resin using the well known acid catalyzed reaction of phenol and aldehyde. The unrecovered phenolic resin (containing water and unreacted phenol) is then made mildly acidic (if not already so) and the aromatic amine added. The final condensation is then carried out by adding further aldehyde to the foregoing mixture while being maintained at a temperature of from about 50° C. to about 125° C., and preferably, from about 95° to about 100° C. At the end of the reaction period, the condensation product can be recovered by stripping off water and unreacted reagents under reduced pressure at temperatures from about 110° C. to about 200° C., and preferably, from about 140° C. to about 170° C.

In general, as first prepared, the amine modified novolac is typically an aqueous solution or dispersion, the exact conditions and respective quantities and types of reactions in any given instance being determinative of the character of the product (including degree of advancement, color, etc.). The amine modified phenolic resin can be concentrated (and even prepared as a solid resin) and impurities such as unreacted reactants largely removed by means of dehydration under vacuum. As those skilled in the art appreciate, typical dehydration conditions are distillations under about 28 inches mercury vacuum until batch temperature reaches about 160 C. though any convenient conditions can be employed.

Yields of amine modified novolac resin typically vary from about 85 to 110 percent (based on combined starting (charged) weights of aromatic amine and phenol). In general, higher aromatic amine mol ratios, as well as higher aldehyde to phenol plus aromatic amine ratios give higher yields. Aniline-phenol-formaldehyde resins prepared as just described generally have the above-described characteristics and constitute a preferred class of amine modified phenolic resins suitable for use in the present invention.

Preferably, an amine-modified novolac is substantially completely dehydrated before use in the present invention. After dehydration, the organic liquid used to disperse the amine-modified novolac can be added while the amine-modified novolac is still at an elevated temperature.

The organic liquid is a dispersant for the resin. By the term "dispersant" is embraced both solvation and suspension. The term "dissolved" as used herein has reference not only to dissolution but also to suspension. It will be appreciated that in a suspension of such resin that the particles suspended are under about 1 micron in average maximum cross-sectional dimension and preferably are under about 200 millimicrons in such dimension.

While the organic liquid used has properties as indicated above, it will be appreciated that such liquid can comprise mixtures of different organic liquids. Preferred liquids are phenols (such as phenol, cresols and xylenols), lower alkanols (such as ethanol and methanol), lower alkanones (such as acetone or methyl ethyl ketone), cycloalkanones (such as cyclohexanone), and ether-esters (such as ethoxyethyl acetate). The term "lower" refers to less than 7 carbon atoms per molecule as used herein. Aromatic, and to a lesser degree, aliphatic (including cycloaliphatic) hydrocarbons can also be employed as solvents for a given resin, including benzene, toluene, xylene, naphthalene, nonane, octane, petroleum fractions, etc. Preferably, the total water content of a varnish of the invention is below about 4 weight percent, and more preferably falls in the range of from about 0.5 to 2 weight percent.

Those skilled in the art will appreciate that care should preferably be taken when water is present to use an organic liquid system in which the phenolic resole resins are completely soluble as well as any water present. Adding, for example, a ketone or an ether-ester solvent like ethoxyethyl acetate will generally improve the water tolerance (ability to dissolve water) of a solvent system.

The varnishes thus made for use in this invention typically comprise:

(A) From about 20 to 75 weight percent of the above-described substituted phenol-formaldehyde amine-modified novolac resin, (B) From about 0.5 to 4 weight percent of dissolved water, and (C) The balance up to 100 weight percent of any given varnish being an organic liquid which:

(1) Is substantially inert (as respects such resin mixture), (2) Boils (evaporates) below about 275° C. at atmospheric pressures, (3) Is a dispersant for such resin and for such water (if present).

These varnishes are characteristically dark colored, one-phase, clear liquid solutions each having a viscosity ranging from about 5–5,000 centipoises. The exact viscosity of a given varnish depends upon many chemical process and product variables. For impregnating applications, viscosities of from about 50 to 500 centipoises are preferred.

The total resin solids content of a given varnish product can be as high as about 85 weight percent, but preferred solids contents usually fall in the range of from about 25 to 65 weight percent.

The polyvinyl acetals useful in this invention are obtained by reacting polyvinyl alcohol or a partially hydrolyzed polyvinyl ester with an aldehyde, such as a lower alkanal like formaldehyde (preferred), acetaldehyde, propionaldehyde, butyraldehyde, mixtures thereof, or the like; or an aromatic aldehyde such as benzaldehyde, or the like. Polyvinyl acetals used in this invention preferably contain hydroxyl groups and preferably contain ester groups, the exact percentage of each in any given polyvinyl acetal depending upon the extent of the hydrolysis and the acetalization reactions. The preferred polyvinyl acetals are polyvinyl formal resins. Preferred polyvinyl acetals for use in this invention contain, on a weight basis, from about 0.1 to 16 weight percent ester groups calculated as polyvinyl ester, 5 to 25 weight percent hydroxyl groups calculated as polyvinyl alcohol, the balance up to 100 weight percent of any given polyvinyl acetal being substantially adehyde acetal calculated as the corresponding polyvinyl acetal. These materials preferably have a weight average molecular weight from about 5,000 to 250,000 and more preferably from 10,000 to 50,000. In preferred polyvinyl acetals used in this invention, the ester groups are substantially all acetate groups, but it will be appreciated that other suitable polyvinyl acetals can contain other ester groups such as formate groups, propionate groups, and the like. Methods for the manufacture of polyvinyl acetals are well known to those of ordinary skill in the art and so are not detailed herein.

The polyvinyl acetals, for use in this invention are conveniently dissolved in an organic liquid.

The organic liquid is a dispersant for the polyvinyl acetal. By the term "dispersant" (as indicated above) is embraced both solvation and suspension and the term "dissolved" as used herein has reference not only to dissolution but also to suspension. It will be appreciated that in a suspension of such polyvinyl acetal that the particles suspended are under about 1 micron in average maximum cross-sectional dimension and preferably are under about 200 millimicrons in such dimension. The organic liquid used for the polyvinyl acetal is preferably a relatively high boiling (e.g. from about 125 to 275° C.). Typical liquids include mixtures of cresylic acid and so-called high flash naphtha.

To speed up the dissolution of the polyvinyl acetal in the liquid, heat may be employed. Typically, a solution of polyvinyl acetal in such an organic medium contains a total solids content ranging from about 5 to 25 weight percent of the polyvinyl acetal. The total solids content of a polyvinyl acetal solution can be as high as about 35 weight percent or even higher and as low as about 5 weight percent or even lower, but preferred such solids contents range from about 10 to 25.

To prepare a liquid enamel coating composition of the invention, it is generally convenient to employ a separately prepared substituted phenol-formaldehyde resin varnish and a separately prepared solution of a polyvinyl acetal in an organic solvent system. The organic liquid used may be a complex mixture of different chemical entities. Thus the organic liquid portion of an enamel composition of this invention can contain liquids boiling over a relatively wide range. It is preferred that a given enamel have a dry point below about 275° C., e.g. all liquid vaporizes at normal atmospheric pressures below this temperature. When a product enamel composition is to be used in wire coating, the art prefers to employ relatively high boiling organic liquids (as described above). The two respective solutions are often simply mixed together in the relative respective amounts needed to produce a product composition having the above indicated contents of respective components. It will be appreciated that any convenient preparation procedure can be employed.

For example, when preparing such a composition for use in wire coating, it is convenient to dissolve a substituted phenol-formaldehyde resin varnish and a polyvinyl formal, each in an organic liquid mixture comprising typically cresylic acid, and one or more aromatic hydrocarbons. Examples of suitable hydrocarbons include petroleum derived mixtures like Solvesso 100 (a high solvency aromatic petroleum naphtha, B.P. 155°–173° C., manufactured by the Humble Oil Co.) xylol, mixtures thereof, and the like. It is usually convenient to employ from about 30 to 70 parts by weight of the aromatic hydrocarbon in a total given such as organic solvent liquid mixture. As those skilled in the art will appreciate, cresylic acid is typically a mixture of different cresols and xylenols. Optionally, one can employ phenol itself as an additive to this mixture of cresylic acid and naphthalenic hydrocarbons. Thus, in general, one can use as much as 50 weight percent, or even more, of phenol in a total given such organic solvent liquid mixture. A preferred such mixture boils in the range of from about 125 to 200° C. The exact choice of a given solvent medium is determined by the boiling point desired for the resulting solution, the cost of the solvents available, viscosity and other coating characteristics desired in a given product solution. In general, one prefers to have in a product solution as low as viscosity as practical for a given total solids content because a low viscosity allows the use of a higher solids content, which in turn tends to desirably reduce the overall cost per pound of solids coating deposited on a substrate due to reduced solvent losses.

An enamel coating composition of this invention typically has a viscosity less than about 50,000 centipoises, with preferred viscosities ranging from about 100 to 10,000 centipoises.

Any metal surface can be coated with a liquid coating composition of this invention as indicated above, but preferred substrate metals are copper or aluminum (in the form of wire filaments ranging in average maximum cross-sectional dimension, typically but not necessarily a diameter from about 0.5 to 500 mils or even greater) and steel sheeting (as incorporated into drums and typically ranging in thickness from about 20 to 32 gauge).

Similarly, a composition of this invention can be applied over a base coating of a polar material, such a non-thermoplastic enamel (such as one of the type conventionally used to insulate magnet wire). It is preferred to use compositions of this invention as top coatings over films of enamels on metal substrates.

Any convenient metal coating procedure can be employed to coat such a metallic substrate with a liquid enamel coating composition of this invention, including spraying, dripping, painting, and the like. After application to a substrate surface, the coating is usually dried at an elevated temperature (e.g. at temperatures of from about 80 to 500° C., depending on the organic liquid used in the enamel) for a time sufficient to crosslink (cure or thermoset) the resulting coating as indicated above. Multiple coatings are especially useful and common, especially in wire coating. It is preferred to thermoset individual coatings after application and before applying a subsequent overcoating. When coating a wire with an enamel composition of this invention, for example, it is usually convenient to employ a so-called wire coating tower (which can be vertically, horizontally or otherwise oriented) in which the tower has a top roller (or a plurality of individual sheaves) and a bottom roller (or a plurality of individual sheaves) rotatably mounted at opposite end regions of the tower. Each roller optionally has a plurality of peripheral grooves therein to accommodate a plurality of individual strands of wire and effect a separation thereof. The central portion of the tower contains an enclosed thermally insulated duct. This duct has at least one controllable heated zone. A first strand of a given wire from a spool is first coated and then passed through the heated zone of the tower. After such passage, the wire is recoated and repassed through the heated zone. After each coating operation and before entry into the heated zone, the freshly coated wire is optionally passed through a wiper die, a felt wiper, a roller die, or the like to limit or control coating thickness. Typically and preferably, the diameter of the wiper die is slightly larger than that of the wire before coating. For example, the diameter of a die can be from about 0.001 to about 0.020 inch greater than the diameter of the uncoated wire where the wire is from about 0.005 to 0.080 inch in diameter. As is well known in the art, fine wire is often coated without using dies or felt wipers.

After a coating operation, a coated wire is wound up, conveniently, on a spool. A wire is thus continuously and rapidly coated, using such a tower, with a plurality of successively applied enamel coatings. Sometimes a first coating or coatings on a wire is used as a primer coat and this first coating can be different from later coatings, and sometimes one or more (e.g. two) top coat layers on a wire is (are) used as a finish coat and such last coating(s) can be different from earlier or intermediate coatings. Preferred top coatings are thermoset compositions of the invention. In general, conventional wire coating towers and associated methods of use can be employed in the practice of coating wire with compositions of this invention. At least one coating layer is derived from compositions of the invention.

Those skilled in the art will appreciate that the compositions of this invention can additionally contain conventional additives, adjuvants, and the like. One especially useful additive for addition to a liquid composition of this invention is a polyurethane (typically from about 5 to 100 weight percent based on polyvinyl acetal). A preferred class of polyurethanes is represented by the following general formula:

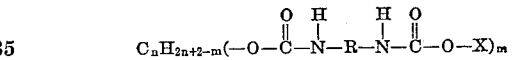

where R represents a member of the class consisting of phenylene, methyl phenylene, naphthylene, and methyl naphthylene groups, X represents a member of the class consisting of phenyl and alkyl phenyl groups, said alkyl groups if present containing from 1 through 6 carbon atoms, $m$ is an integer greater than 1 but not greater than $n$, and $n$ is an integer from 2 through 10. These particular polyurethanes are aliphatic aromatic polyesters of aromatic dicarbamic acids.

Another especially useful additive is a melamine-formaldehyde condensate (typically from about 1 to 10 weight percent based on the polyvinyl acetal). Suitable melamine-formaldehyde condensates are addition products of formaldehyde and melamine to produce a methylolated melamine product containing mono, di, tri, tetra, penta, and/or hexa methylolated melamine species. Thus, typical melamine-formaldehyde condensates have mol ratios of formaldehyde to melamine of from about 1 to 1 to 1 to 6.

When these formulations are used for drum liners, one can conventionally compound with a liquid composition of this invention up to about 30 weight percent of a pigment.

DESCRIPTION OF THE DRAWINGS

The invention is better illustrated by reference to the attached drawings herein:

FIG. 1 is a cross-sectional view through a circular magnet wire topcoated with a composition of this invention.

FIG. 2 is a cross-sectional view through the center axis of a coil of wire made using wire similar to that illustrated in FIG. 1 after the same has been heat treated to fuse adjacent topcoatings together.

FIG. 3 is an enlarged diagrammatic sectional view taken through a region of FIG. 2 showing the manner in which individual wires are bound together using a composition of this invention.

Turning to FIG. 1, there is seen a wire 10 which has been first coated as in a wire coating tower with a plurality of individual coatings 12 of conventional wire enamel. Over the topmost of these coatings is deposited from 1 to 4 additional layers 14 of a composition of this invention. These coatings 12 and 14 are deposited on the wire 10 using a conventional wire coating tower and solutions of material as hereinabove described.

Wire such as illustrated in FIG. 1 is wound on a suitably formed reel so as to produce a coil of configuration as illustrated in FIG. 2. After so being wound, the coil is removed from the reel and subjected to a heat treatment as hereinabove described which fuses the adjacent wires to one another through their respective topcoating 14 (not shown in FIG. 2). The result is an integral structure. The nature of the structure in FIG. 2 is illustrated in FIG. 3 where it is seen that the individual phenol and aniline and the upper layer being mostly water. The yield of solid resin is about 88 percent based on the sum of the phenol and aniline charge.

EXAMPLES B THROUGH K

Following the same general procedure described in Example A, a series of amine-modified phenolic resins are prepared from phenol, aniline, and formaldehyde. Table I below describes each resin.

EXAMPLES L THROUGH U

Following the same general procedure described in Example A, a series of amine-modified phenolic resins are prepared using various substituted phenols and aromatic amines. Table II below describes such resin.

TABLE I

| Example | B | C | D | E | F | G | H | I | J | K |
|---|---|---|---|---|---|---|---|---|---|---|
| Molar ratio of aniline to phenol | 1/3 | 1/1 | 3/2 | 3/2 | 2/1 | 3/1 | 4/1 | 9/1 | 9/1 | 20/1. |
| Molar ratio of formaldehyde to aniline plus phenol. | 0.60/1 | 0.71/1 | 0.725/1 | 0.752/1 | 0.71/1 | 0.71/1 | 0.75/1 | 0.93/1 | 0.99/1 | 0.99/1. |
| Catalyst | Formic acid. | Propionic acid. | Formic acid. | Oxalic acid. | Propionic acid. | Formic acid. | Formic acid. | Oxalic acid. | Formic acid. | Formic acid. |
| Percent yield (based on aniline plus phenol charged). | 82 | 88 | 94 | 88 | 96 | 98 | 96 | 106 | 110 | 111. |

TABLE II

| Example | L | M | N | O | P | Q | R | S | T | U |
|---|---|---|---|---|---|---|---|---|---|---|
| Molar ratio of phenol | 3.39/1 | 2.74/1 | 2.42/1 | 1.11/1 | 2.06/1 | 9/1 | 9/1 | 9/1 | 1.32/1 | 3.68/1. |
| Identification of phenol | p-Nonyl phenol. | p-Phenyl phenol. | t-Butyl phenol. | Phenol | p-Chloro phenol. | Phenol | o-Cresol | Phenol | Phenol | Bis phenol A. |
| Identification of aromatic amine | Aniline | Aniline | Aniline | o-Chloro-aniline. | Aniline | (¹) | Aniline | o-Toluidine. | o-Toluidine. | Aniline. |
| Molar ratio of formaldehyde to aromatic amine plus phenol. | 0.725/1 | 0.725/1 | 0.725/1 | 0.725/1 | 0.725/1 | 0.93 | 0.93 | 0.93 | 0.725/1 | 0.725/1. |
| Catalyst | Formic acid. | Formic acid. | Formic acid. | Formic acid. | Formic acid. | Formic acid. | Formic acid. | Formic acid. | Formic acid. | Formic acid. |

¹ One part aniline to two parts ortho-toluidine is employed in this example. In general, a preferred amine-modified novolac for use in this invention contains both aniline and ortho-toluidine in the mol ratio of from about 5:1 to 1:9 aniline to ortho-toluidine.

coatings 14 are fused together at respective points of mutual contact.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of amine-modified novolac resins for use in this invention are given below.

EXAMPLE A.—PREPARATION OF AMINE-MODIFIED PHENOLIC RESIN

A mixture of 1005 grams (10.7 moles) of phenol and 995 grams (10.7 moles) of aniline is heated to 70° C. in a 5 liter, 3-neck Pyrex reaction flask that is equipped with stirrer, thermometer, reflux condenser and dropping funnel. At 70° C., 26.6 grams (0.52 mole) of 90 percent strength formic acid is added and allowed to mix. Next, over about a 2½ hour period, 915 grams (15.25 moles) of 50 weight percent aqueous formaldehyde solution is added to the reaction mixture while stirring vigorously. The reaction mixture is refluxed for 45 minutes at about 100° C. The reaction flask is then changed over to vacuum distillation conditions and vacuum slowly applied up to about 7″ Hg (temperature stabilized at about 90° C.). As the temperature reached about 95° C. (with about 7″ Hg vacuum), the vacuum is increased slowly to about 20″ Hg. When the temperature reached about 110° C., the vacuum is increased slowly to 28″ Hg. The temperature is then allowed to rise to 160° C. with 28″ Hg of vacuum while continuing to distill. At 160° C., the distillation is stopped and the product poured into a pan to cool. The resulting amine-modified phenolic resin is a clear, brittle, glass-like solid at room temperature. The distillate has two phases; the lower layer being mostly

EXAMPLE 1

An enamel is mixed in the following manner. All parts are by weight.

A slurry is made of 100 grams of polyvinyl formal of weight average molecular weight approximately 18,000 containing 6 weight percent hydroxyl groups calculated as polyvinyl alcohol, and 12 weight percent acetate groups calculated as polyvinyl acetate, in 1200 grams each Solvesso 100 and xylene. While this slurry is stirred, 300 grams cresylic acid and 170 grams ethoxyethyl acetate are added, followed by 100 grams of the aniline-toluidine-phenol novolac described in Example Q. When all have dissolved to form a clear enamel of 22 percent solids, the viscosity is 30 centipoises at 25° C.

Two coats of this enamel are applied over four coats of a commercial polyesterimide magnet wire enamel ("Isomid," a product of Schenectady Chemicals, Inc. made from trimellitic anhydride, terephthalic and/or isophthalic acid, an aromatic diamine (e.g. 4,4′-bis-aminophenyl) methane, ethylene glycol, glycerol, and/or tri(2-hydroxyethyl) isocyanurate) on AWG #18 copper wire at 50 feet per minute through an oven 25 feet tall, the lower half of which is maintained at 580° F. and the upper half of which is maintained at 725° F. The thickness of each coating is controlled to 0.0005″±0.0001″ by means of a graduated series of spring-clip wiper dies, 44, 45, 46, 47, 47 and 48 mils diameter of hole. The thickness of the base coating is 0.001″; the thickness of the dry overcoat was 0.0005″.

Helices are wound from this wire on a mandrel of 0.25″ diameter, and cut into specimens of 4″ length. Each specimen is placed on a 0.25″ vertical rod and on top it is placed a 200 gram weight. This assembly is then placed in a 200° C. oven for two hours, removed and allowed to cool. The specimens are then broken as beams of 2″ span using an Instron universal tester, the crosshead of which moves at the rate of 0.2 inch per minute. Mean bond strength (breaking strength measured at 23° C.) is 26 pounds. Mean bond strength at the same temperature is 23 pounds after oven bonding at 180° C. and 8 pounds after oven bonding at 160° C.

Other specimens are dipped in 10 percent solutions of a blocked triisocyanate.

The solvent comprises (on a 100 weight percent basis) 60 weight percent toluene and 40 weight percent ethanol. The blocked isocyanate comprises an adduct of 1 mole of trimethylol propane, 3 moles of 2.4-tolylene diisocyanate, and 3 moles of phenol; this blocked isocyanate is available commercially under the trade designation "Mondur S" from Mobay Chemical Company.

The so-dipped specimens are dried 2 hours while hanging freely at 200° C. and tested in the same manner. The bond strength is 27 pounds. When dried at 160° for two hours, it was bond instead, the bond strength is 22 pounds.

At elevated temperatures, the mean bond strengths are as follows:

| Test temperature, ° C.: | Oven-bonded at 200° C. for 2 hours, lbs. | Dried at 200° C. after dipping into triisocyanate solution, lbs. |
|---|---|---|
| 105 | 6.1 | 7.2 |
| 130 | 2.3 | 3.2 |
| 155 | 1.6 | 2.6 |
| 180 | 0.6 | 1.4 |

Other relevant properties of this wire are as follows:

Flexibility: When elongated 25 percent, then wound on its own diameter, no cracking is visible using 7X magnification.

Abrasion resistance: 1400 grams, when tested for unidirectional scrape resistance according to the method of MW–1000 published by the National Electrical Manufacturers' Association.

Heat shock: No cracks are visible when the wire is wrapped around a mandrel of three times its diameter after a pre-elongation of 20-percent and tested at 225° C. according to the aforementioned MW–1000.

EXAMPLE 2

Materials are the same as in Example 1, except that only 60 parts of the aniline-toluidine-phenol novolac are used per 100 parts of polyvinyl formal resin. Viscosity at 19 percent solids is 33 poises at 25° C.

Two coats of this enamel are applied over four coats of the polyesterimide enamel of Example 1 on AWG #18 copper wire at 50 feet/min., oven bottom temperature 580° F., oven top temperatures 700° F. and 750° F. Flexibility, abrasion and heat-shock resistance are similar to Example 1. Bond strengths are as follows:

| Type of bonding | Coating oven temperature (top), ° F. | Bond strength, lbs., at— 23° C. | 155° C. |
|---|---|---|---|
| Thermal, 200° C. | 700 | 29 | 0.6 |
|  | 750 | 17 | 1.3 |
| Blocked triisocyanate dip, 200° C. | 700 | 37 | 3.0 |
|  | 750 | 30 | 4.8 |

EXAMPLE 3

A solution is made of 100 grams of a 9:1 aniline-cresol novolac (Example R) in 300 grams cresylic acid, 180 grams ethoxyethyl acetate, 200 grams Solvesso 100 and 50 grams xylene. While stirring rapidly, 100 grams of the polyvinyl formal of Example 1 are slowly added. The viscosity of the enamel so made at 21.5 percent solids is 25 poises at 25° C.

Two coats of this enamel are applied over four coats of the polyesterimide enamel of Example 1 on AWG #18 copper wire at 50 feet per minute using oven temperatures of 580° F. (bottom), and 700 and 750° F. (top). Flexibility, abrasion and heat-shock resistance are similar to Example 1. Bond strengths are as follows:

| Type of bonding | Coating oven temperature (top), ° F. | Bond strength, lbs., at— 23° C. | 155° C |
|---|---|---|---|
| Thermal 200° C. | 700 | 37 | 0.5 |
|  | 750 | 32 | 0.9 |
| Blocked triisocyanate dip, 200° C. | 700 | 38 | 3.8 |
|  | 750 | 23 | 2.8 |

EXAMPLE 4

A solution is made of 60 grams of a 9:1 ortho-toluidine novolac (Example S) in 260 grams cresylic acid, 156 grams Solvesso 100 and 234 grams xylene. Before the novolac had completely dissolved, 100 grams of the polyvinyl formal of Example 1 is added with rapid stirring.

Two coats of enamel so mixed are applied over four coats of the polyesterimide of Example 1 enamel on AWG #18 copper wire at 50 feet per minute, using an oven bottom temperature of 580° F. and oven top temperatures of 700 and 780° F. Flexibility, abrasion and heat shock resistance are excellent and similar to Example 1. Bond strengths are as follows:

| Type of bonding | Coating oven temperature (top), ° F. | Bond strength, lbs., at— 23° C. | 155° C. |
|---|---|---|---|
| Thermal, 200° C. | 700 | 32 | 1.4 |
|  | 780 | 18 | 2.4 |
| Blocked triisocyanate dip, 200° C. | 700 | 21 | 6 |
|  | 780 | 19 | 8 |

EXAMPLE 5

A solution is made of 50 grams of a 9:1 aniline-phenol novolac (Example J) in 425 grams ethoxyethyl acetate, 33 grams cyclohexanone, 137 grams cresylic acid, and 137 grams Solvesso 100. With rapid stirring 100 grams of a polyvinyl formal of similar chemical composition to that of Example 1, but having a weight average molecular weight of about 32,000, is then added. A turbid enamel results with a viscosity at 25° C. of 30 poises at 17 percent solids.

Three coats of this enamel are then applied over AWG #18 copper wire pre-coated with six coats of a commercial polyesteramideimide enamel (Enamel Omega, manufactured by Westinghouse Electric Corp.) at 50 feet per minute, using an oven bottom temperature of 400° F., and oven top temperatures of 500° and 600° F. Flexibility, abrasion and heat shock resistance were adequate and similar to Example 1.

Bond strengths were as follows:

| Type of bonding | Coating oven temperature (top), ° F. | Bond strength, lbs., at— 23° C. | 150° C. |
|---|---|---|---|
| Thermal, 180° C. | 500 | 31 | 1.3 |
|  | 600 | 38 | 1.7 |
| Blocked triisocyanate dip, 180° C. | 500 | 24 | 1.8 |
|  | 600 | 23 | 2.5 |

EXAMPLE 6

50 grams of a 1.5:1 aniline-phenol novolac (Example D) is dissolved in 284 grams cresylic acid, 192 grams ethoxyethyl acetate, and 230 grams Solvesso 100. While rapidly stirring, 100 grams of the polyvinyl formal of Example 1 is then added to form an enamel, 17.5 percent solids, with a viscosity of 30 poises at 25° C.

This enamel is applied in three coats over pre-coated polyesteramideimide wire as in the previous example.

Flexibility, abrasion and heat shock resistance are similar to the preceding example. Bond strengths are as follows:

| Type of bonding | Coating oven temperature (top), °F. | Bond strength, lbs., at— 23° C. | 150° C. |
|---|---|---|---|
| Thermal, 180° C | 500 | 27 | 0.3 |
|  | 600 | 34 | 1.5 |
| Blocked, triisocyanate dip, 180° C | 500 | 25 | 2.1 |
|  | 600 | 26 | 2.3 |

EXAMPLE 7

This example, unlike the foregoing, illustrates a thermosetting magnet wire coating which results when suitable curing agents are combined with an amine-modified novolac and a polyvinyl formal.

The following materials are successively weighed into a mixing vessel.

| | Grams |
|---|---|
| Resimene 882–60 [1] | 8.3 |
| Blocked triisocyanate | 50 |
| 9:1 toluidine phenol novolac (Ex. S) | 45 |
| Cresylic acid | 240 |
| Solvesso 100 | 165 |
| Xylene | 190 |

[1] A 60 percent solution in xylene of a sulfonamide-modified, butylated melamine-formaldehyde condensate, manufactured by Monsanto.

While this mixture is stirred rapidly, 100 grams of the polyvinyl formal of Example 1 was added and stirring continued until all components form a clear solution of 25 percent solids content, and a viscosity of 42 poises at 25° C.

This enamel is applied in six coats over AWG #18 copper wire at 50 feet per minute, using an oven-bottom temperature of 550° F., and a top temperature of 800° F. Total film thickness is 0.0014 inch. Properties are as follows:

Flexibility: When stretched 25 percent and wound on its own diameter, no cracks develop.

Adherence: When rapidly stretched to break, the coating does not loosen or crack.

Abrasion resistance: Mean 1630 grams, by the method of Example 1.

Heat shock: A specimen elongated 20 percent, wound on a 0.081 inch mandrel (twice wire diameter) and heated one hour at 180° C. does not crack.

Thermoplastic flow: Crossed wires under a pressure of 2 kilograms, heated at a rate of 5° C. per minute, reach a mean temperature of 300° F. before metal-to-metal contact.

Dielectric strength: Pairs of wires twisted 9 turns in 4.75 inches and immersed in water at 23° C. for 24 hours prior to testing have a mean breakdown voltage of 5,700 volts.

Solvent resistance: The coating remains intact while immersed ten minutes in a boiling mixture of equal parts of toluene and ethanol.

Extract: The proportion of the coating removed by two hours' immersion in boiling methanol is 1.8 percent.

EXAMPLE 8

A viscous enamel is made in the following manner. Into 50 grams of the polyvinyl formal of Example 1 are poured 75 grams xylene and 88 grams ethoxyethyl acetate. Stirring is commenced and 115 grams cresylic acid and 50 grams 3:1 aniline-phenol novolac (Example G) are added. Stirring is continued until a slightly cloudy solution was obtained. Viscosity at 27.5 percent solids was 148 poises at 25° C.

This enamel, cast onto a tetrafluoroethylene sheet and dried 30 minutes at 135° C. followed by 45 minutes at 160° C., forms a flexible film approximately 0.0012 inch thick. When a piece of this film is placed between two sheets of kraft paper and heated ½ hour at 150° C. and 500 p.s.i., the paper is bonded so that it tears away from the joint, which remained intact. In general, films of 0.0002" to 0.010" thick can be produced by this method, such films comprising the resin composition of this invention.

EXAMPLE 9

The enamel of Example 8 is coated on a cleaned sheet of steel, then dried one hour at 160° C. A glossy, abrasion-resistant, impervious film results. When this is placed in contact with another cleaned sheet of steel and laminated ½ hour at 160° C. and 10,000 p.s.i., a strong bond is formed between the two sheets.

EXAMPLE 10

In a manner similar to Example 1, a solution is made of 100 grams of the aniline-toluidine-phenol novolac described in Example Q and 100 grams of polyvinyl butyral of weight average molecular weight approximately 40,000, containing 19 weight percent hydroxyl groups calculated as polyvinyl alcohol and less than 1 percent acetate groups calculated as polyvinyl acetate, in a solvent mixture of 730 grams cresylic acid, 200 grams ethoxyethyl acetate, and 170 grams xylene. The enamel so produced is suitable for a self-adhesive overcoat on enamelled magnet wire and to form an adhesive bond between sheets of metal.

What is claimed is:

1. A metal coating resin composition comprising, in combination:
   (A) a polyvinyl acetal characterized by having:
      (1) a weight average molecular weight of from about 5,000 to 250,000 and
      (2) from about 0.5 to 16 weight percent ester groups calculated as polyvinyl ester, from about 5 to 25 weight percent hydroxyl groups calculated as polyvinyl alcohol, and the balance up to 100 weight percent of any given polyvinyl acetal being substantially aldehyde acetal calculated as the corresponding polyvinyl acetal,
   (B) an aromatic amine-modified novolac resin characterized by having:
      (1) a number average molecular weight of from about 200 to 1,000,
      (2) at least two aryl moities per molecule, the aryl nucleus of each aryl moiety containing from 6 through 10 carbon atoms each,
      (3) at least one divalent bridging moiety of the formula:

wherein $R_1$ and $R_2$ are each individually selected from the group consisting of hydrogen lower alkyl, lower alkalene, lower haloalkyl aryl of from 6 through 12 carbon atoms, haloaryl of 6 through 12 carbon atoms, and heterocyclic structures containing rings with 5 or 6 members each, each individual ring containing an oxygen, a sulphur, or a nitrogen atom, each such heterocyclic structure being bonded to the carbon atom of said bridging moiety, said bridging moiety having the unsatisfied valences of its carbon atom each bonded to a different one of said aryl moiety,
      (4) at least one >NH group per molecule, one bond of which is directly attached to one of said aryl nuclei and the other bond of which is attached to another of said aryl nuclei or to a radical $R_1$ as defined above,
      (5) at least one OH group per molecule each such group being directly attached to a different one of said two aryl nuclei,
      (6) a percent oxygen acetyl of from about 3 to 26, and (7) a percent nitrogen acetyl of from about 3 to 26.

2. A composition of claim 1 containing a weight ratio (dry weight basis) of said aromatic polyvinyl acetal, to said amine-modified novolac resin of from about .15 to 15.

3. A liquid enamel composition comprising a composition of claim 2 dispersed in from about 10 to 98 weight percent (total composition basis) of an organic liquid which:
(A) is substantially inert,
(B) has a dry point below about 275° C. at atmospheric pressures,
(C) is a dispersant for both said resin and said polyvinyl acetal.

4. A conductive wire coated with a composition of claim 1.

5. A film composed of a composition of claim 1.

6. A composition of claim 1 wherein the said polyvinyl acetal comprises a polyvinyl formal.

7. A composition of claim 1 wherein the said amine-modified novolac resin comprises a condensate of an aniline, a phenol, and formaldehyde.

8. The composition of claim 7 wherein the said amine-modified novolac resin comprises aniline, toluidine, phenol, and formaldehyde.

9. A composition of claim 1, wherein said aromatic amine modified novolac resin comprises a condensate of toluidine, paranonyl phenol and formaldehyde.

References Cited
UNITED STATES PATENTS

| | | | |
|---|---|---|---|
| 2,441,542 | 5/1948 | Lawrence | 260—844 |
| 2,534,923 | 12/1950 | Nagel et al. | 260—844 |
| 2,554,262 | 5/1951 | Nagel | 260—844 |
| 2,836,518 | 5/1958 | Loritsch et al. | 260—844 |
| 3,471,443 | 10/1969 | Bornstein | 260—844 |
| 3,516,858 | 6/1970 | Fitzhugh et al. | 260—844 |

JOAN C. BLEUTGE, Primary Examiner

U.S. Cl. X.R.

117—128.4, 132 A, 132 BF, 161 L, 161 LN, 218, 232; 260—32.8 N, 33.4 P, 33.6 UA, 38, 839, 841, 844